3,586,508
TETRAPOLYMER SUBBED PHOTOGRAPHIC FILM
William Frank Fowler, Jr., and Gerhard Klose, Rochester, N.Y., assignors to Eastman Kodak Company, Rochester, N.Y.
No Drawing. Filed Nov. 30, 1967, Ser. No. 686,833
Int. Cl. G03c 1/80
U.S. Cl. 96—87    6 Claims

ABSTRACT OF THE DISCLOSURE

The disadvantages encountered in the use of subbing or u-coat compositions comprising relatively large proportions (above 35%) of vinylidene chloride are overcome by the use of a haloalkyl acrylate, vinylidene chloride, alkyl acrylate, or methacrylate, and itaconic acid tetrapolymer which provides excellent adhesion while permitting a reduction of the vinylidene chloride content of the subbing composition to substantially below 35% (i.e., below about 25%).

---

The present invention relates to polymeric lattices and to their use as anchoring substrata to improve adhesion between film supports and radiation sensitive layers coated thereon.

In the prior art, it was found that in order to obtain vinylidene chloride terpolymers which have an adequate degree of adherence to the film base and to a water-permeable colloid layer the minimum amount of vinylidene chloride which had to be incorporated therein was 35 percent by weight.

While terpolymers containing a substantially large proportion of vinylidene chloride (greater than 35 percent by weight) have been described in several U.S. patents including 2,491,023, 2,627,088, 2,698,235, and 2,698,240 as subs for a variety of polyester and cellulose ester-type film supports, copolymers having such high percentages of vinylidene chloride units in their composition have certain inherent disadvantages, e.g., at pH's above 6.5 they become badly discolored on standing for even short periods of time at room temperature. Such a situation renders storage for long periods of time difficult and, indeed, in some applications impractical. Furthermore, coatings of lattices which are high in vinylidene chloride content tend to decompose, once applied, on drafting and tentering of the poly(ethylene terephthalate) film supports. This not only results in discolored film, but it also liberates highly corrosive hot hydrogen chloride gas. The polymer lattices of the present disclosure markedly reduce such tendencies through marked and substantial reduction in the proportion of vinylidene chloride present in the polymeric lattice.

It is, therefore, the object of the present invention to provide an improved subbing system or polymeric lattice substrata which provides improved adhesion of radiation sensitive layers to polyester or cellulose ester film supports while concurrently reducing the proportionate amount of vinylidene chloride present in such layers and consequently obviating the above-described problems.

We have found that the disadvantages cited above may be overcome and excellent subbing materials obtained by copolymerizing compositions comprising from about 15 to about 30 percent by weight of vinylidene chloride, from about 25 to about 70 percent by weight of a haloalkyl ester of an unsaturated carboxylic acid selected from the group consisting of 2-chloroethyl acrylate and 2-chloroethyl methacrylate, from about 10 to about 60 percent by weight of an ethylenically unsaturated monomer selected from the group consisting of acrylonitrile, alkyl acrylates, and alkylmethacrylates of at most 10 carbon atoms and from about 0.01 to about 2.0 percent by weight of an unsaturated carboxylic acid having at most 10 carbon atoms, such as itaconic acid, acrylic acid or monomethyl itaconate. Furthermore, the addition of the haloalkyl acrylate or methacrylate to the compositions endows the resulting copolymers with significantly greater solubility in inexpensive organic solvents such as, 4-methyl-2-pentanone and acetone, thereby making them more readily available as very dilute solutions such as are used in certain aspects of photographic film manufacture.

According to the preferred embodiments of the present invention, the acid portion of the copolymer ranges from about 0.05 to about 1.5 percent by weight, the vinylidene chloride portion ranges from about 17 percent to about 25 percent by weight, the 2-chloroethyl acrylate or methacrylate ranges from about 30 to about 60 percent by weight, and the ethylenically unsaturated portion of the copolymer ranges from about 15 to about 50 percent by weight of the copolymer, improved adhesion being achieved within these ranges.

The above object is accomplished in accordance with this invention by applying a tetrapolymer of the above-described composition to a film base composed of a polyester such as poly(ethylene terephthalate) or a cellulose ester such as cellulose triacetate. To be more specific, elements of the above type can advantageously be prepared by applying to a polyester, e.g., poly(ethylene terephthalate), or cellulose ester, e.g., cellulose acetate, cellulose acetate butyrate, cellulose acetate propionate, cellulose tributyrate, and cellulose tripropionate film base, a solution of the aforesaid tetrapolymers in a volatile organic solvent, such as acetone or benzene and drying the same. An organic solvent dispersion of gelatin and an acid or a solution of any number of other copolymer compositions may then be coated over the tetrapolymer layer "u-coat" of this invention as a sublayer. Alternatively, the second sublayer may be dispensed with and a radiation sensitive layer, for example, a colloid-silver halide dispersion, e.g., a gelatino-silver halide emulsion, coated directly onto the tetrapolymer sublayer. A plurality of differentially sensitized gelatino-silver halide emulsion layers can be similarly applied, if desired, to make a multilayer photographic elment, for example, for color photography. These emulsion layers may contain in addition to sensitizing dyes to modify their spectral sensitivity, various types of color primers, couplers, etc. The film base may be treated on both sides in the manner just described. The radiation sensitive layer applied to the tetrapolymer coated film base may also be of the type utilized in the manufacture of magnetic recording tape, i.e., it may consist of a dispersion of magnetic particles in a conventional polymeric binding lattice which is applied either directly to the tetrapolymer subcoating or to a sublayer coating applied over a u-coat of the tetrapolymer.

Other radiation sensitive layers which may be applied over the subbing layers of the present invention include thermosensitive layers which normally consist of a crystalline polymer which converts from a crystalline to an amorphous structure at a precisely determined and specified temperature. The conversion produces a visible change which indicates the temperature.

The novel copolymers of our invention are prepared by copolymerizing by well-known methods, a mixture of monomers comprising (a) vinylidene chloride; (b) a haloalkyl acrylate or methacrylate; (c) an unsaturated carboxylic acid monomer of at most 10 carbon atoms such as itaconic acid, acrylic acid, or a monoalkyl and hence acidic ester of itaconic acid; and (d) an ethylenically unsaturated alkyl having at most 10 carbon atoms selected from the group consisting of acrylonitrile and alkyl acrylates or methacrylates, the vinylidene chloride content of the copolymer being in all cases substantially less than 35 percent by weight.

The haloalkyl acrylate and preferably the 2-chloroethyl acrylate suitable for use in this invention can be prepared as follows: A mixture of benzene (5,000 ml.), acrylic acid (1,441.2 g., 20 moles), ethylene chlorohydrin (1,610 g., 20 moles), p-toluenesulfonic acid (100 g.), and an inhibitor such as hydroquinone or methylhydroquinone (100 g.) are heated until azeotropic distillation of water ceases; the reaction mixture is then cooled, the benzene removed under reduced pressure at a low temperature of about 25° C. and the crude product distilled in vacuo to obtain 2,175 g. (80.8%) of 2-chloroethyl acrylate, B.P. 56–58° C./16 mm., $n_D^{25}=1.4465$. The 2-chloroethyl acrylate can also be prepared in 84 percent yield by an acid catalyzed ester interchange reaction between methyl acrylate and ethylene chlorohydrin.

Alternatively, if a haloalkyl methacrylate is to be used, it, and in particular 2-chloroethyl methacrylate, can be prepared in 73 percent yield from ethylene chlorohydrin and methacrylic acid by the method described above for the preparation of the haloalkyl acrylate. This product has a boiling point of 27–31° C. 0.1–0.2 mm., $n_D^{27}=1.4470$. 2-chloroethyl methacrylate may also be prepared from ethylene chlorohydrin and methyl methacrylate as described above (via the ester interchange).

The unsaturated carboxylic acid monomer of at most 10 carbons, as stated above, may consist of any number of monoalkyl esters of itaconic acid such as the monoethyl and monomethyl esters thereof in addition to itaconic and acrylic acid. Furthermore, the monoalkyl and hence acidic esters of α-methyleneglutaric acid as well as the acid itself may be utilized as this member of the tetrapolymer composition.

The ethylenically unsaturated alkyl acrylates or methacrylates of less than 10 carbons suitable for use in the tetrapolymers of the present invention include: methyl, ethyl or butyl acrylates; methyl, isobutyl, methoxyethyl methacrylates; methoxy acrylates and the like or mixtures of two or more of these compounds.

The copolymers of the present invention may be prepared according to a variety of well-known methods including those disclosed in U.S. Pats. 2,160,903 and 2,160,937 to 2,160,943 inclusive, 2,160,945, 2,160,946, and 2,160,947.

The copolymerization may, for example, be conducted in an aqueous emulsion containing the various monomers, catalysts, and activators, such as potassium persulfate-potassium metabisulfite redox combinations, and an emulsifying and/or dispersing agent such as sodium dodecyl sulfate. The total catalyst-activator concentration should be kept within the range of 0.1 to 1.0 percent of the weight of the monomer charge in order to ensure high average polymer molecular weight.

Although the specific properties of the various polymeric compositions may vary according to the specific monomers incorporated therein, in photographic applications the proportions of the reactants should be chosen and the polymerization carried out to such an extent that a layer 0.1 mil in thickness shall confer adequate moisture proofing characteristics to the film base upon which it is coated while providing improved adhesion of the gelatin or other radiation sensitive layers to the film base. The thickness of the layer is of course not limited to 0.1 mil, but may be less, e.g., 0.05 mil or more as, for example, 1.0 mil or more.

The coating solutions should have a solids content of about 3 percent to about 35 percent by weight and have a viscosity suitable for flowing, brushing, spraying, or spreading so that they may be applied to the polyester or cellulose ester film bases described above.

In the case of application to photographic materials, the coating can be applied on a commercial scale using the standard types of equipment utilized in the manufacture of photographic film. The polymer sublayer may be deposited on the polyester or cellulose ester film base by any of the usual coating methods used in the manufacture of photographic elements, e.g., by immersing of the surfaces of the film base which are to be coated into a solution of the coating material, spraying, beading, or coating from a hopper provided with a doctor blade.

A further anchoring substratus, as for example, a thin gelatin sublayer as disclosed in U.S. Pat. 2,491,023 or a radiation sensitive layer, e.g., a colloid-silver halide layer or a plurality of such layers, anti-halation layers, etc., may be applied over the substrate coating of this invention.

The invention will be further illustrated by the following example.

EXAMPLE 2-chloroethyl acrylate (66 g.), methyl acrylate (15 g.) vinylidene chloride (17 g.), itaconic acid (2 g.), water (400 g.), Triton 770 (a surfactant) (40% aqueous solution, 125 g.), potassium persulfate (0.5 g.) and potassium metabisulfate (0.5 g.) are placed in a one-quart bottle, the bottle flushed with nitrogen, capped and tumbled at 15 r.p.m. end-over-end in a 40° C. water bath for 16 hours.

The resulting emulsion is cooled to room temperature and filtered to obtain a copolymer latex containing 19.8 percent solids and having on isolation, an inherent viscosity of 1.4 in cyclohexanone.

*Analysis.*—Calculated for $$(C_4H_6O_2)_{15}(C_5H_7ClO_2)_4(C_2H_2Cl_2)_{34}(C_5H_6O_4)_2$$

(percent): C, 40.2; H, 4.5; Cl, 37.8. Found (percent): C, 39.9; H, 4.8; Cl, 38.5.

A thin film of 0.5 mil in thickness cast from the latex on a piece of glass is dried at 53° C. for about 6 hours and shows excellent adhesion to the glass. A similar result is obtained when a film of poly(ethylene terephthalate) 4 mils thick is drawn through a similar emulsion and dried at room temperature to provide a copolymer coating 0.5 mil thick on both sides on the film.

Films produced as above are clear, transparent, and show excellent adhesion to the film base.

A variety of subbing solutions may be applied over the u-coat and prior to the application of the radiation sensitive layer. These include the various solutions described in U.S. Pat. 2,491,023 as well as conventional gelatin subbing compositions.

Various emulsion components such as sensitizing dyes, desensitizing agents, fog inhibitors, emulsion stabilizers, color formers, light screening dyes and pigments may also be present in such layers.

The invention has been described in detail with particular reference to preferred embodiments thereof, but it will be understood that variations and modifications can be effected within the spirit and scope of the invention as described hereinabove and as defined in the appended claims.

We claim:

1. A radiation sensitive film element comprising a film base, having coated upon at least one side thereof (a) a layer consisting essentially of a tetrapolymer of from about 0.01 to about 2 percent by weight of an unsaturated carboxylic acid of at most 10 carbon atoms, from about 15 to about 30 percent by weight of vinylidene chloride, from about 25 to about 70 percent by weight of a haloalkyl ester of an unsaturated carboxylic acid selected from the group consisting of 2-chloroethyl acrylate and 2-chloroethyl methacrylate and from about 10 to about 60 percent by weight of an ethylenically unsaturated monomer selected from the group consisting of acrylonitrile and alkyl acrylates and alkyl methacrylates of at most 10 carbon atoms and (b) at least one radiation sensitive water permeable colloidal layer coated upon said copolymer layer.

2. The article of claim 1 wherein said film base consists essentially of a material selected from the group consisting of poly(ethylene terephthalate), cellulose acetate, cellulose triacetate, cellulose acetate butyrate, cellulose acetate propionate, cellulose tributyrate and cellulose tripropionate.

3. The article of claim 2 wherein said unsaturated carboxylic acid of at most 10 carbon atoms is selected from the group consisting of acrylic acid, itaconic acid, α-methylene-glutaric acid, monoalkyl esters of itaconic acid and monoalkyl esters of α-methyleneglutaric acid.

4. The article of claim 2 wherein said ethylenically unsaturated monomer selected from the group consisting of alkyl acrylates and methacrylates of at most 10 carbon atoms is selected from the group consisting of methyl acrylate, ethyl acrylate, butyl acrylate, methyl methacrylate, isobutyl methacrylate and methoxyethyl acrylate.

5. The article of claim 2 wherein the radiation-sensitive layer is a gelatino-silver halide emulsion layer.

6. The article of claim 2 wherein said tetrapolymer consists essentially of from about 0.05 to about 1.5 percent by weight of said unsaturated carboxylic acid, from about 17 to about 25 percent by weight of said vinylidene chloride, from about 30 to about 60 percent by weight of said haloalkyl ester of an unsaturated carboxylic acid, and from about 15 to about 50 percent by weight of said ethylenically unsaturated monomer.

References Cited

UNITED STATES PATENTS

| | | | |
|---|---|---|---|
| 2,570,478 | 10/1951 | Pitzl | 96—87 |
| 2,698,235 | 12/1954 | Swindells | 96—87 |
| 3,053,661 | 9/1962 | Starck et al. | 260—80.81 |
| 3,143,421 | 8/1964 | Nadeau et al. | 96—87 |
| 3,353,958 | 11/1967 | Moede | 96—87 |
| 3,443,950 | 5/1969 | Rawlins | 96—87 |

MURRAY KATZ, Primary Examiner

J. E. MILLER, Assistant Examiner

U.S. Cl. X.R.

96—75